(12) United States Patent
Fischer et al.

(10) Patent No.: US 9,945,470 B2
(45) Date of Patent: Apr. 17, 2018

(54) INTERNAL VENTING SYSTEM FOR INDUSTRIAL MACHINES

(71) Applicant: Harnischfeger Technologies, Inc., Wilmington, DE (US)

(72) Inventors: Richard Fischer, Hartland, WI (US); Nicholas Dame, Kenosha, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 0 days.

(21) Appl. No.: 15/383,252

(22) Filed: Dec. 19, 2016

(65) Prior Publication Data

US 2017/0097085 A1    Apr. 6, 2017

Related U.S. Application Data

(63) Continuation of application No. 14/687,325, filed on Apr. 15, 2015, now Pat. No. 9,534,682, which is a continuation of application No. 14/024,726, filed on Sep. 12, 2013, now Pat. No. 9,009,993.

(60) Provisional application No. 61/704,095, filed on Sep. 21, 2012.

(51) Int. Cl.
| | |
|---|---|
| *F16H 57/027* | (2012.01) |
| *E21C 27/30* | (2006.01) |
| *E02F 9/20* | (2006.01) |
| *E02F 9/14* | (2006.01) |
| *E02F 3/42* | (2006.01) |
| *E02F 3/30* | (2006.01) |
| *F16H 57/02* | (2012.01) |

(52) U.S. Cl.
CPC ........... *F16H 57/027* (2013.01); *E02F 3/304* (2013.01); *E02F 3/422* (2013.01); *E02F 9/14* (2013.01); *E02F 9/2016* (2013.01); *E21C 27/30* (2013.01); *F16H 2057/02034* (2013.01); *F16H 2057/02082* (2013.01)

(58) Field of Classification Search
CPC .......... E02F 3/30; E21C 27/30; F16H 57/027; F16H 2057/02034
USPC ...... 37/395, 397, 403, 404; 180/339; 310/16
See application file for complete search history.

(56) References Cited

U.S. PATENT DOCUMENTS

| | | | |
|---|---|---|---|
| 3,145,582 | A | 5/1964 | Wagner |
| 6,129,056 | A | 10/2000 | Skeel et al. |
| 6,820,708 | B2 | 11/2004 | Nakamura |
| 7,546,892 | B2 | 6/2009 | Lan et al. |

(Continued)

FOREIGN PATENT DOCUMENTS

| | | |
|---|---|---|
| CN | 102535572 | 7/2012 |
| CN | 102725454 | 10/2012 |

(Continued)

OTHER PUBLICATIONS

First Office Action from the State Intellectual Property Office of China for Application No. 201310443419.X dated Nov. 23, 2016 (13 pages).

*Primary Examiner* — Gary S Hartmann
(74) *Attorney, Agent, or Firm* — Michael Best & Friedrich LLP

(57) ABSTRACT

A mining shovel includes a boom and a transmission unit coupled to the boom. The transmission unit includes an outer housing, an internal motor housing disposed within the outer housing, and a venting system coupled to the outer housing to direct air through both the outer housing and the internal motor housing.

12 Claims, 17 Drawing Sheets

(56) References Cited

U.S. PATENT DOCUMENTS

| | | |
|---|---|---|
| 7,562,739 B2 | 7/2009 | Lan et al. |
| 7,646,118 B2 | 1/2010 | Yoshida et al. |
| 8,272,151 B2 | 9/2012 | Ries et al. |
| 8,540,042 B2 * | 9/2013 | Atarashi .................. B60K 1/04 180/68.1 |
| 8,825,317 B2 | 9/2014 | Colwell et al. |
| 9,009,993 B2 | 4/2015 | Fischer et al. |
| 9,534,682 B2 | 1/2017 | Fischer et al. |
| 2010/0116087 A1 | 5/2010 | Mueller |
| 2011/0277961 A1 * | 11/2011 | Knepper .................. F01P 3/18 165/104.19 |
| 2013/0249336 A1 | 9/2013 | Voelz et al. |

FOREIGN PATENT DOCUMENTS

| | | |
|---|---|---|
| CN | 103057391 | 4/2013 |
| JP | S582417 | 1/1983 |
| JP | 2012112102 | 6/2012 |
| WO | 0201009 | 1/2002 |
| WO | 0220955 | 3/2002 |
| WO | 2011089934 | 7/2011 |

* cited by examiner

INTERNAL VENTING SYSTEM FOR INDUSTRIAL MACHINES

CROSS-REFERENCE TO RELATED APPLICATIONS

This application is a continuation of U.S. patent application Ser. No. 14/687,325, filed Apr. 15, 2015, which is a continuation of U.S. patent application Ser. No. 14/024,726, filed Sep. 12, 2013, now U.S. Pat. No. 9,009,993, which claims priority to U.S. Provisional Application No. 61/704,095, filed Sep. 21, 2012, the entire contents of each of which are incorporated herein by reference.

FIELD OF THE INVENTION

The present invention relates to venting systems for transmission units in industrial machines such as electric rope and power shovels.

BACKGROUND OF THE INVENTION

In the mining field, and in other fields in which large volumes of materials must be collected and removed from a work site, it is typical to employ industrial machines including a large dipper for shoveling the materials from the work site. Industrial machines, such as electric rope or power shovels, draglines, etc., are used to execute digging operations to remove material from, for example, a bank of a mine. Electric rope shovels typically include a shovel boom, a handle pivotally extending from the boom and supporting the dipper, and a sheave or pulley rotatably supported on the boom. The handle is driven by a transmission unit (i.e., a crowd drive assembly) including, among other components, a crowd motor, belt, sheaves, gearing, etc. A hoist rope extends around the sheave or pulley and is connected to the shovel dipper to raise and lower the dipper, thereby producing an efficient digging motion to excavate the bank of material.

When the industrial machine impacts a bank of material, the transmission unit of the machine generates large amounts of energy from the inertia, which drive the boom handle and the boom forward, and thereby causes boom jacking.

Transmission units require constant cooling and ventilation in order to function properly. Currently, transmission units are cooled by using ducting routed directly to a motor in the transmission unit. When cooling is required for a gear case in the transmission unit, an external heat exchanger must be installed.

SUMMARY

In accordance with one construction, a mining shovel includes a boom and a transmission unit coupled to the boom. The transmission unit includes an outer housing, an internal motor housing disposed within the outer housing, and a venting system coupled to the outer housing to direct air through both the outer housing and the internal motor housing.

In accordance with another construction, a mining shovel includes a boom having a substantially sealed, inner cavity, and a transmission unit coupled to the boom. The transmission unit includes an outer housing, an internal motor housing disposed within the outer housing, and a venting system coupled to the outer housing to direct air through the substantially sealed boom, the outer housing, and the internal motor housing.

In accordance with another construction, a mining shovel includes a boom and a transmission unit coupled to the boom. The transmission unit includes an outer housing and an internal motor housing disposed within the outer housing. The transmission unit also includes a venting system coupled to the outer housing to direct air into the outer housing, the venting system including a blower coupled to the boom, and a plurality of duct sections disposed along an exterior of the boom that direct air from the blower to the outer housing.

Other aspects of the invention will become apparent by consideration of the detailed description and accompanying drawings.

Figure 1:
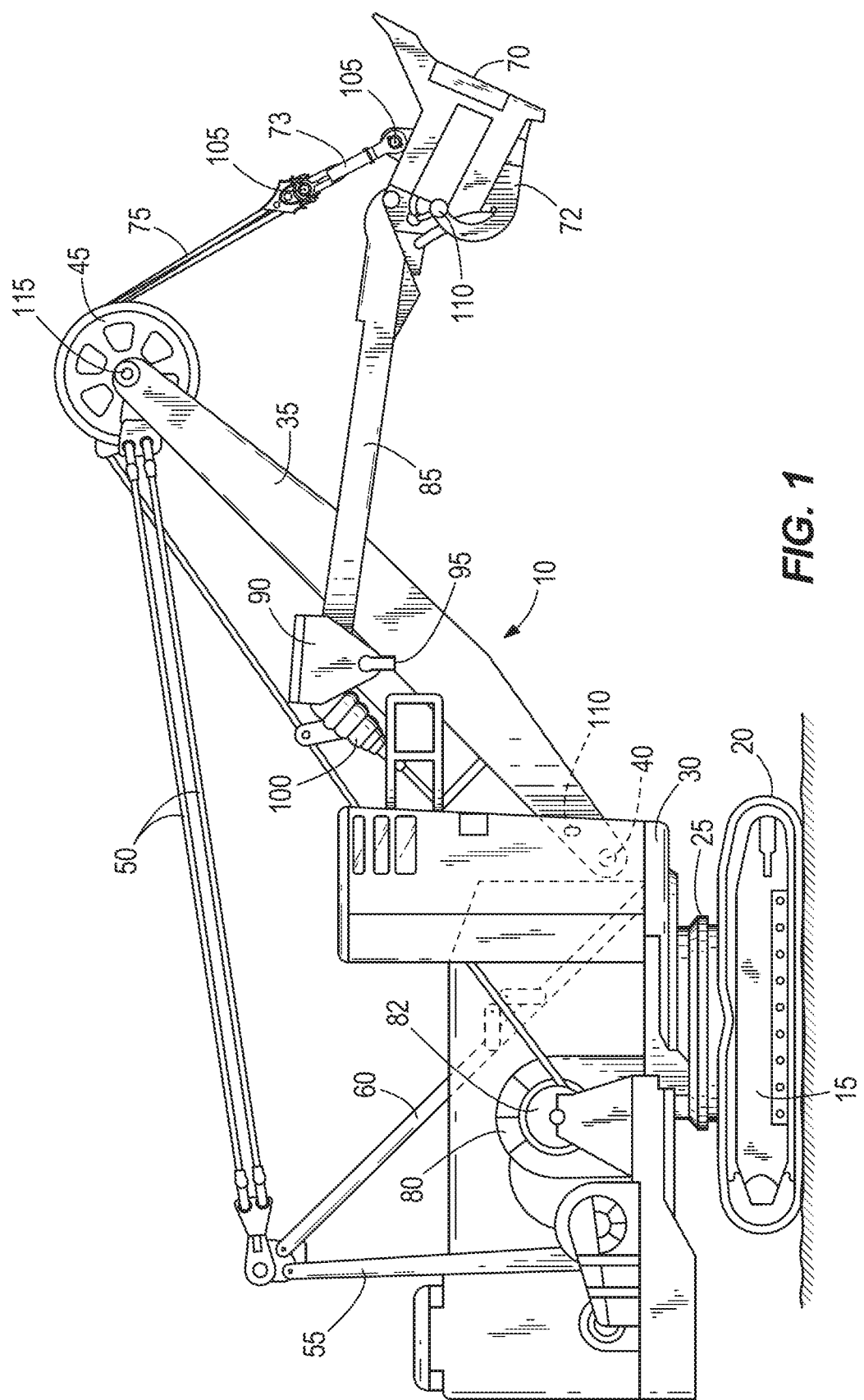
FIG. 1 illustrates an industrial machine, including a transmission unit.

Before any constructions of the invention are explained in detail, it is to be understood that the invention is not limited in its application to the details of the construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

Although the invention described herein can be applied to, performed by, or used in conjunction with a variety of industrial machines, embodiments of the invention described herein are described with respect to an electric rope or power shovel, such as a power shovel 10 shown in FIG. 1. The shovel 10 includes a mobile base 15, drive tracks 20, a turntable 25, a revolving frame 30, a boom 35, a boom lower end 40 (also called a boom foot), tension cables 50, a gantry tension member 55, a gantry compression member 60, a dipper 70 having a door 72, a bail 73, one or more hoist ropes 75, a hoist drum 80, a dipper arm or handle 85, a saddle block 90, a pivot point 95 (e.g., a shipper shaft), a transmission unit 100 (i.e., a crowd drive), two bail pins 105, a dipper door pin 110, and a boom point pin 115. Examples of other transmission units for a shovel 10 are described in U.S. patent application Ser. No. 13/835,363, filed on Mar. 15, 2013, the entire contents of which are hereby incorporated by reference.

With continued reference to FIG. 1, the mobile base 15 is supported by the drive tracks 20. The mobile base 15 supports the turntable 25 and the revolving frame 30. The turntable 25 is capable of 360 degrees of rotation about the revolving frame 30 relative to the mobile base 15. The boom 35 is pivotally connected at the lower end 40 to the revolving frame 30. The boom 35 is held in an upwardly and outwardly extending relation to the revolving frame 30 by the tension cables 50, which are anchored to the gantry tension member 55 and the gantry compression member 60. The gantry compression member 60 is rigidly mounted on the revolving frame 30, and the sheave 45 is rotatably mounted on the upper end of the boom 35.

The dipper 70 is suspended from the boom 35 by the hoist ropes 75. The hoist rope 75 is wrapped over the sheave 45 and attached to the dipper 70 at the bail 73. The hoist rope 75 is anchored to the hoist drum 80 of the revolving frame 30. The hoist drum 80 is driven by at least one electric motor 82 that incorporates a transmission unit (not shown). As the hoist drum 80 rotates, the hoist rope 75 is paid out to lower the dipper 70 or pulled in to raise the dipper 70. The dipper handle 85 is also rigidly attached to the dipper 70. The dipper handle 85 is slidably supported in a saddle block 90, and the saddle block 90 is pivotally mounted to the boom 35 at the pivot point 95. The dipper handle 85 includes a rack tooth formation thereon that engages a drive pinion mounted in the saddle block 90. The drive pinion is driven by an electric motor and the transmission unit 100 to extend or retract the dipper arm 85 relative to the saddle block 90.

An electrical power source (not shown) is mounted to the revolving frame 30 to provide power to the hoist electric motor 82 for driving the hoist drum 80, one or more crowd electric motors for driving the transmission unit 100, and one or more swing electric motors for turning the turntable 25. Each of the crowd, hoist, and swing motors is driven by its own motor controller or drive in response to control signals from a controller (not shown) associated with the operation of shovel 10. The controller is electrically and/or communicatively connected to a variety of modules or components of the shovel 10.

Figure 2:
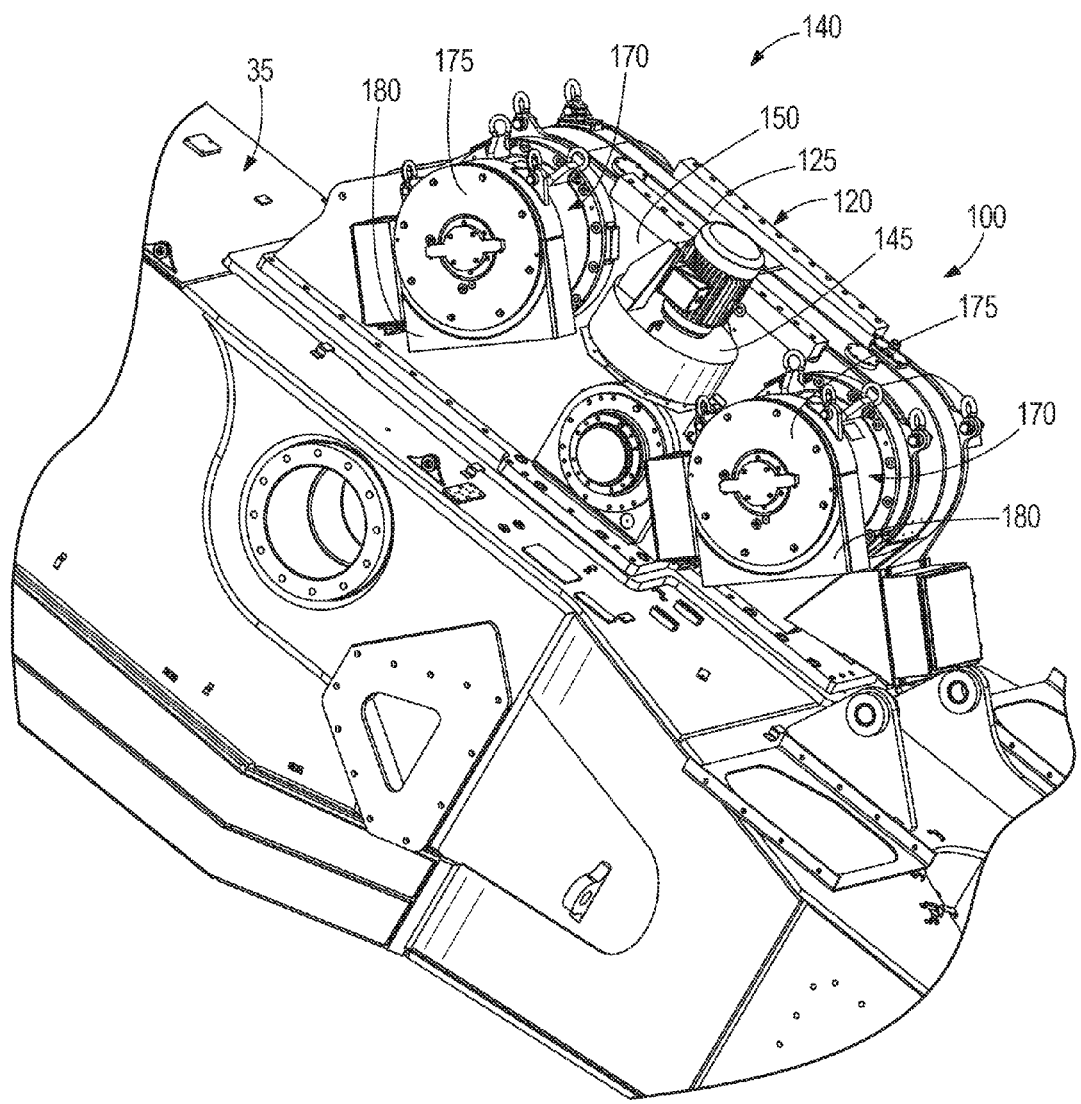
FIG. 2 illustrates the transmission unit of FIG. 1, along with a venting system according to one construction of the invention.
Figure 3:
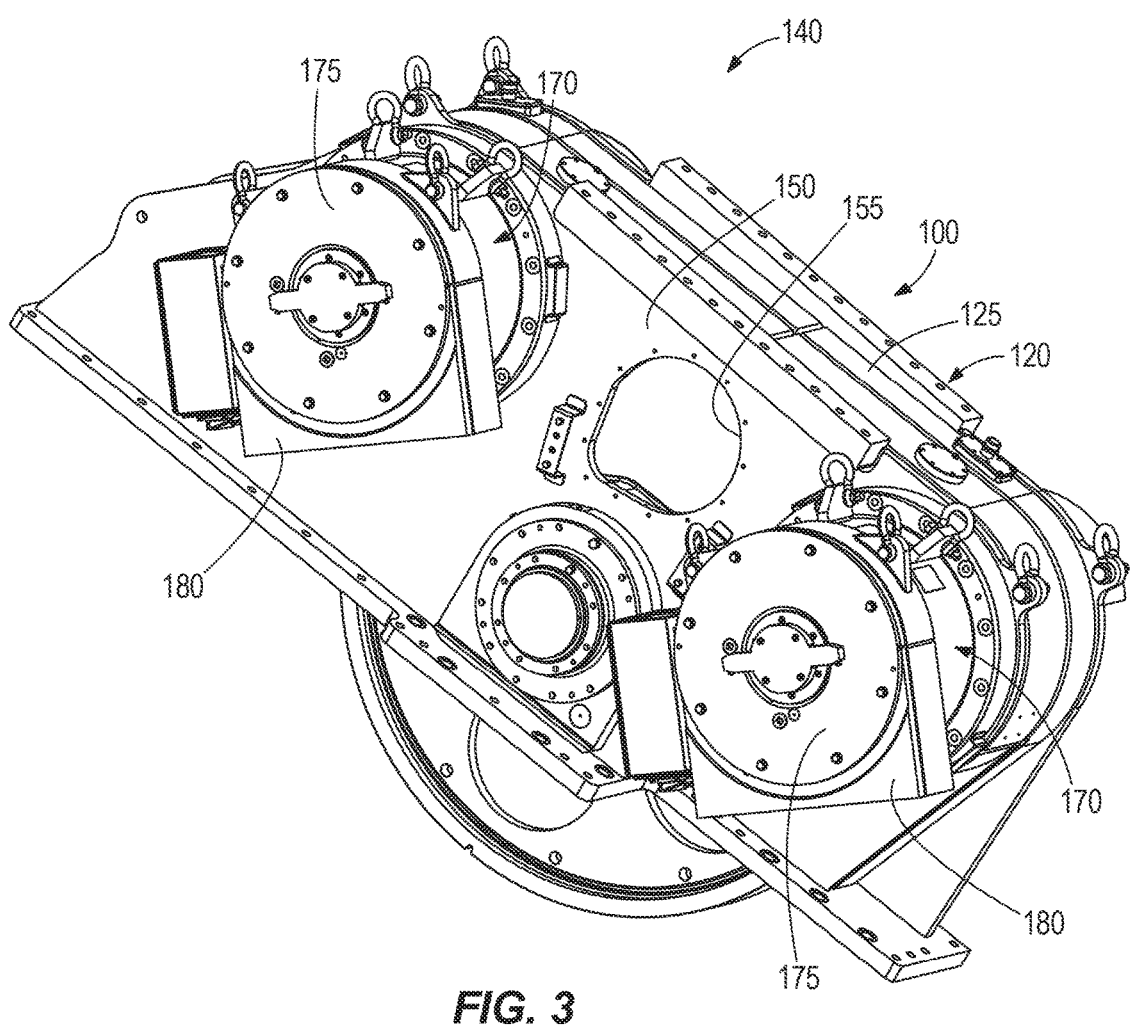
FIG. 3 illustrates the transmission unit and the venting system of FIG. 2, wherein a blower of the venting system is removed.
Figure 4:
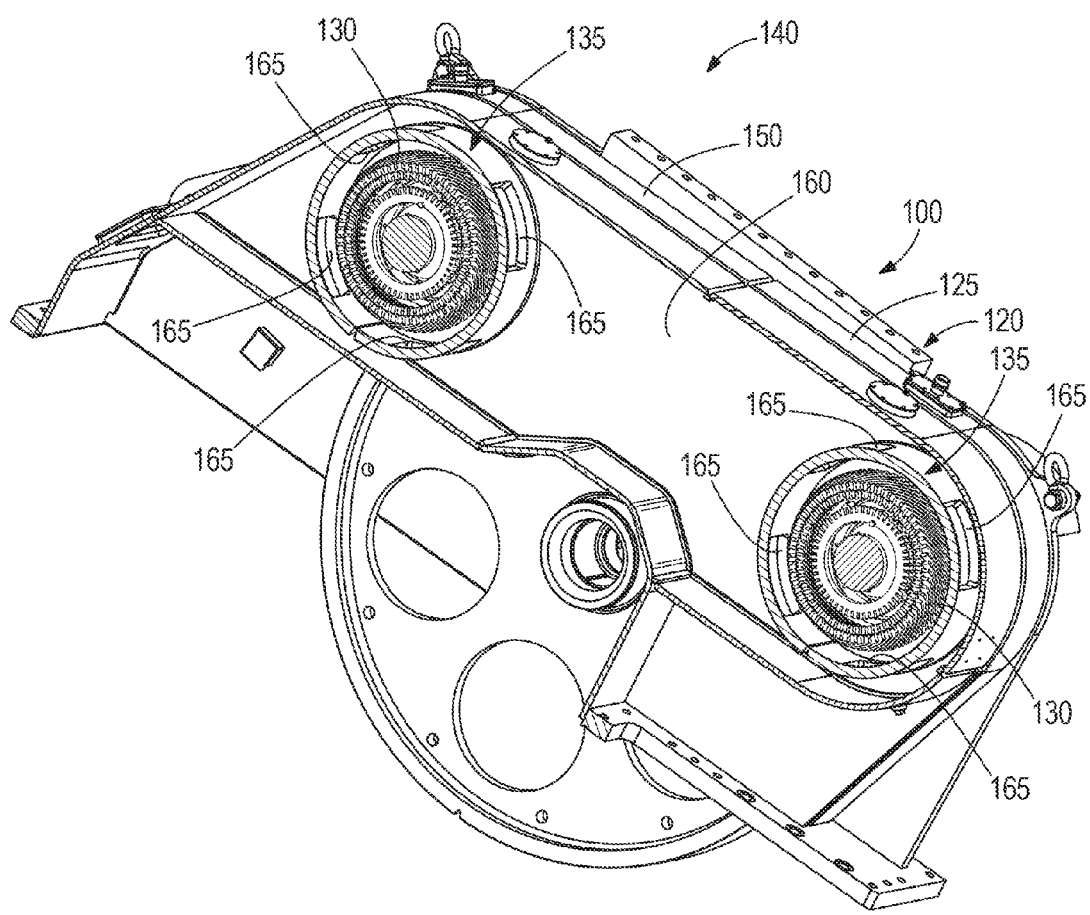
FIG. 4 illustrates the transmission unit and the venting system of FIG. 2, wherein the blower of the venting system and a cover of a gear case are removed.

With reference to FIGS. 2-4, the transmission unit 100 includes a housing 120. The housing 120 includes a gear case 125. As illustrated in FIG. 4, disposed inside the housing 120 are two motors 130. Each of the motors 130 is also disposed inside an interior motor housing 135.

During operation of the transmission unit 100, the gear case 125, the motors 130, and the interior motor housings 135 are subjected to high levels of heat. In order to combat overheating, the shovel 10 includes a venting system 140 for cooling the gear case 125, the motors 130, and the interior motor housings 135. As illustrated in FIG. 2, the venting system 140 includes an AC electric motor and a blower 145 coupled to the housing 120 along an exterior surface 150 of the housing 120. As illustrated in FIGS. 3 and 4, the blower 145 pushes cool air through a cool air input 155 into a cool air cavity 160 inside the housing 120. As the air enters the cool air cavity 160, the air removes heat from the gear case 125 and cools the gear case 125.

With reference to FIG. 4, once the air has worked its way into housing 120 and has cooled the gear case 125, the air enters each of the internal motor housings 135 through apertures 165 positioned approximately 90 degrees apart on the internal motor housings 135. Other constructions include different numbers and arrangements of apertures 165. The air circulates in each of the internal motor housings 135 and cools the motors 130 and internal motor housings 135.

With reference to FIGS. 2 and 3, the air (which has been warmed) then exits through two external motor housings 170 that are coupled (e.g., integrally formed with) the housing 120. The external motor housings 170 include distal ends 175 spaced from the gear case 125. The distal ends 175 include openings disposed at lower portions 180 that permit the warmed air (as illustrated by the arrows) to exit the transmission unit 100 into the ambient environment. Other constructions include different exit points for the warmed air, including one or more apertures along the exterior surface 150 or other locations along the external motor housings 175.

In some constructions the blower 145 pushes cool air into the cool air cavity 160 of the housing 120 through the cool air input 155. As the air enters the cool air cavity 160, the air removes heat from the gear case 125 and cools the gear case 125. The cool air then is separated into separate pathways (e.g., with a divider wall or walls) inside the housing 120 prior to entering the motors 130 for cooling and exhausting the motors 130 and the internal motor housings 135.

In some constructions the blower 145 is reversed mounted to completely reverse the air flow scheme described above. For example, the blower 145 draws the heated air from the cavity 160, the motors 130, and the internal motor housings 135, and the heated air is then exhausted outside. The heated air from the motors 130 and the internal motor housings 135 is kept separated (e.g., with a divider wall or walls) from the heated air from the cavity 60 until the two sources of heated air reach a suction side of the blower.

Figure 5:
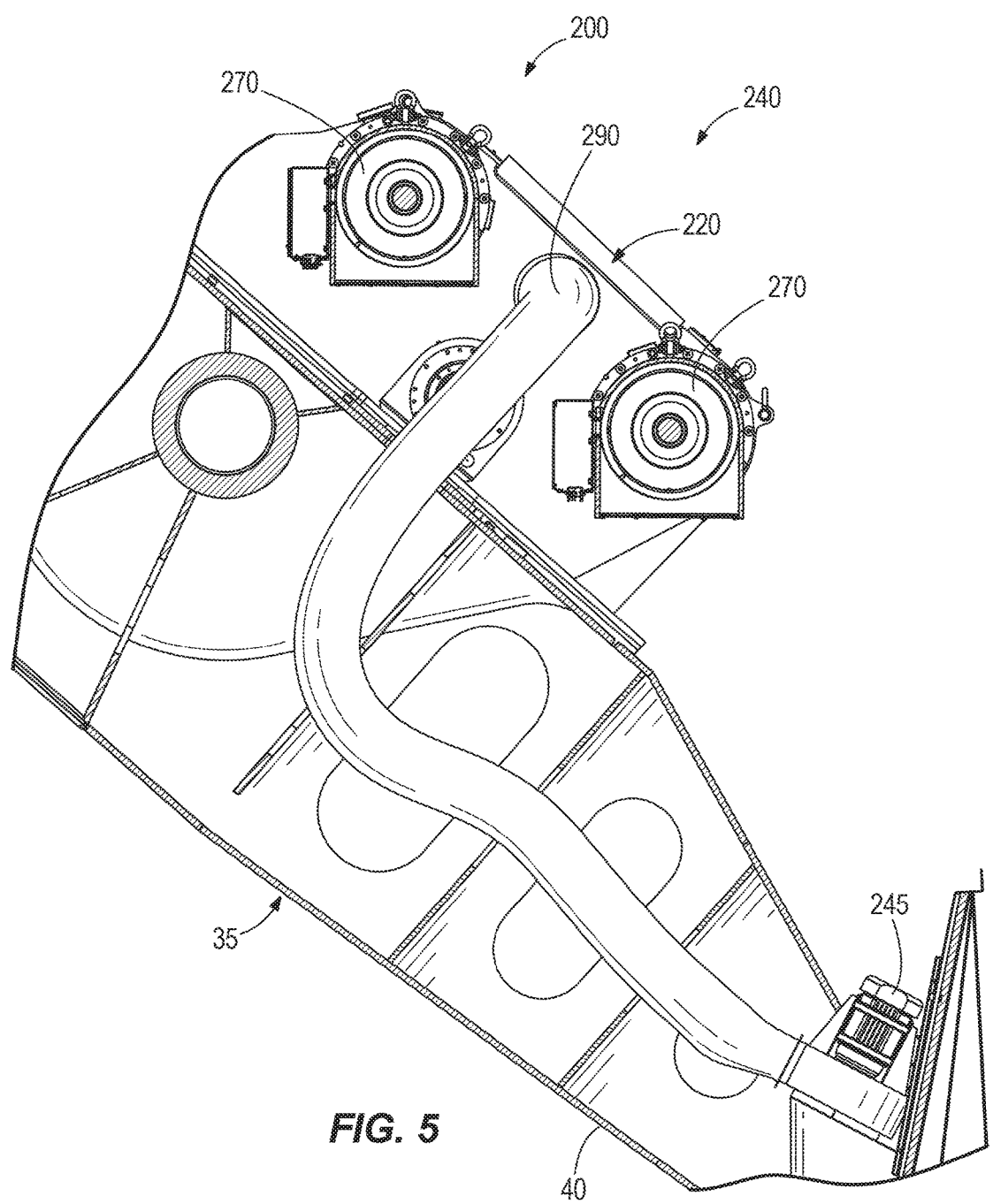
FIGS. 5 and 6 illustrate a transmission unit and a venting system according to another construction of the invention, the venting system including internal ducting extending from a blower to a transmission unit.
Figure 6:
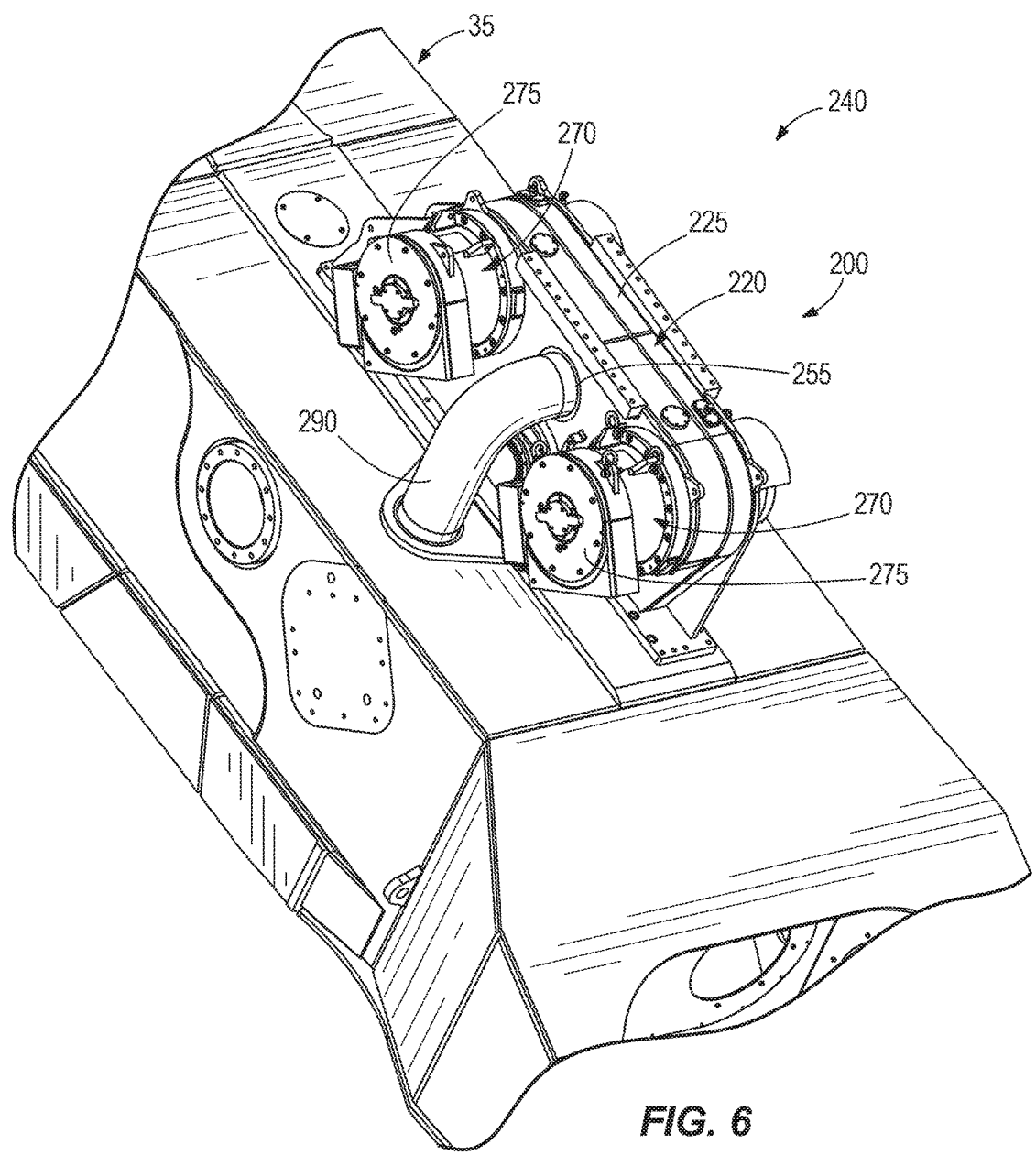

FIGS. 5 and 6 illustrate a venting system 240 according to another construction of the invention. The venting system 240 employs much of the same structure and has many of the same properties as the previously-described venting system 140 shown in FIGS. 2-4. Analogous elements to those of venting system 140 have been given the same number plus "100."

With reference to FIG. 5, a blower 245 is positioned at or near the lower end 40 of the boom 35. In other constructions the blower 245 is positioned elsewhere on the boom 35 or the shovel 10, for example on an outside wall of the boom 35, or at or near an upper end of the boom 35.

With reference to FIGS. 5 and 6, the blower 245 directs cold air through a set of ducting 290 disposed inside of the boom 30. The cold air is directed up to a cool air input 255 in a housing 220 of a transmission unit 200, the housing 220 including a gear case 225. Similar to the venting system 140, the air cools the gear case 225 and the motors and the internal motor housings (not shown) disposed inside the housing 220 before exiting, for example, at distal ends 275 of external motor housings 270.

Figure 7:
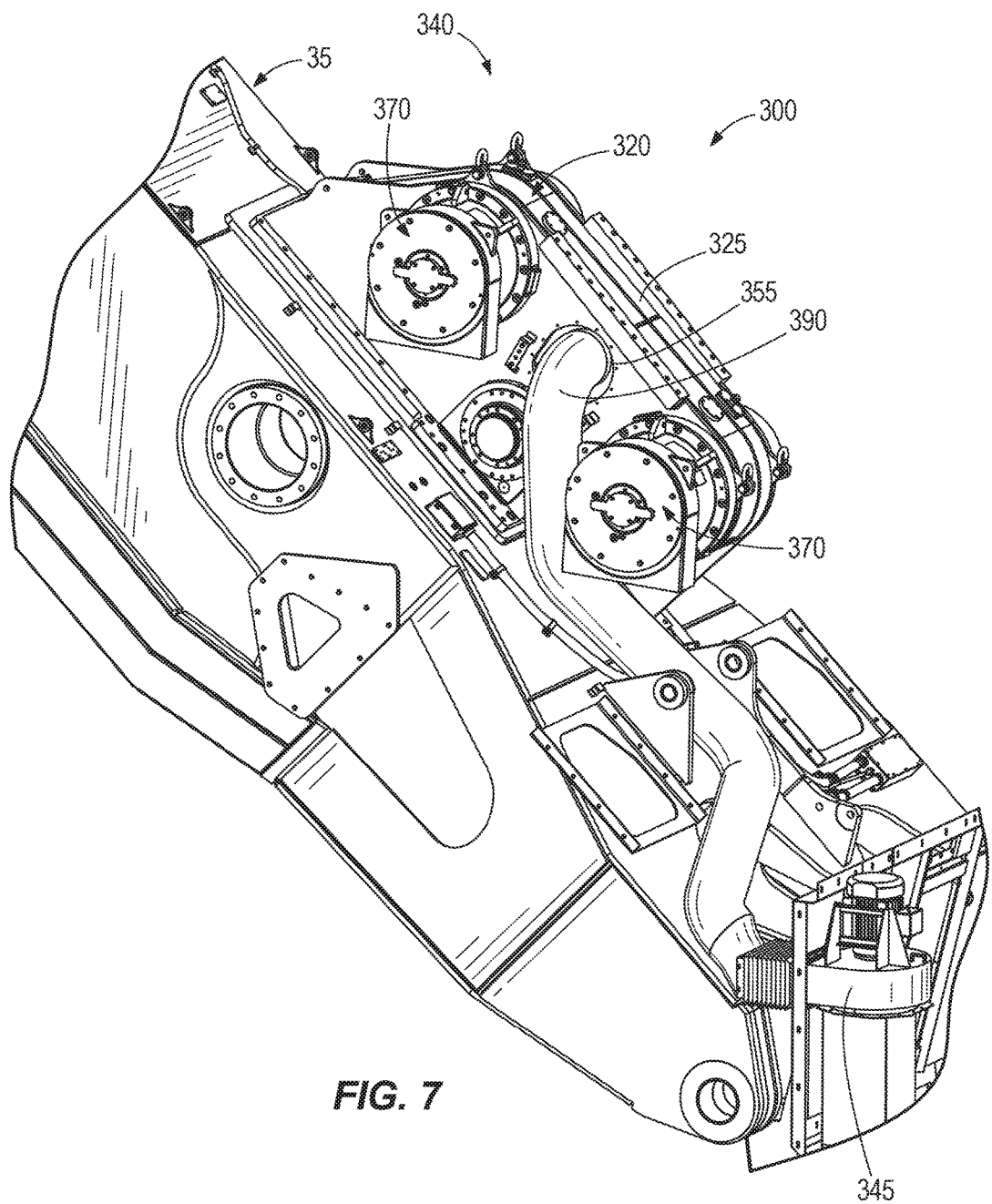
FIG. 7 illustrates a transmission unit and a venting system according to another construction of the invention, the internal venting system including external ducting.
Figure 8:
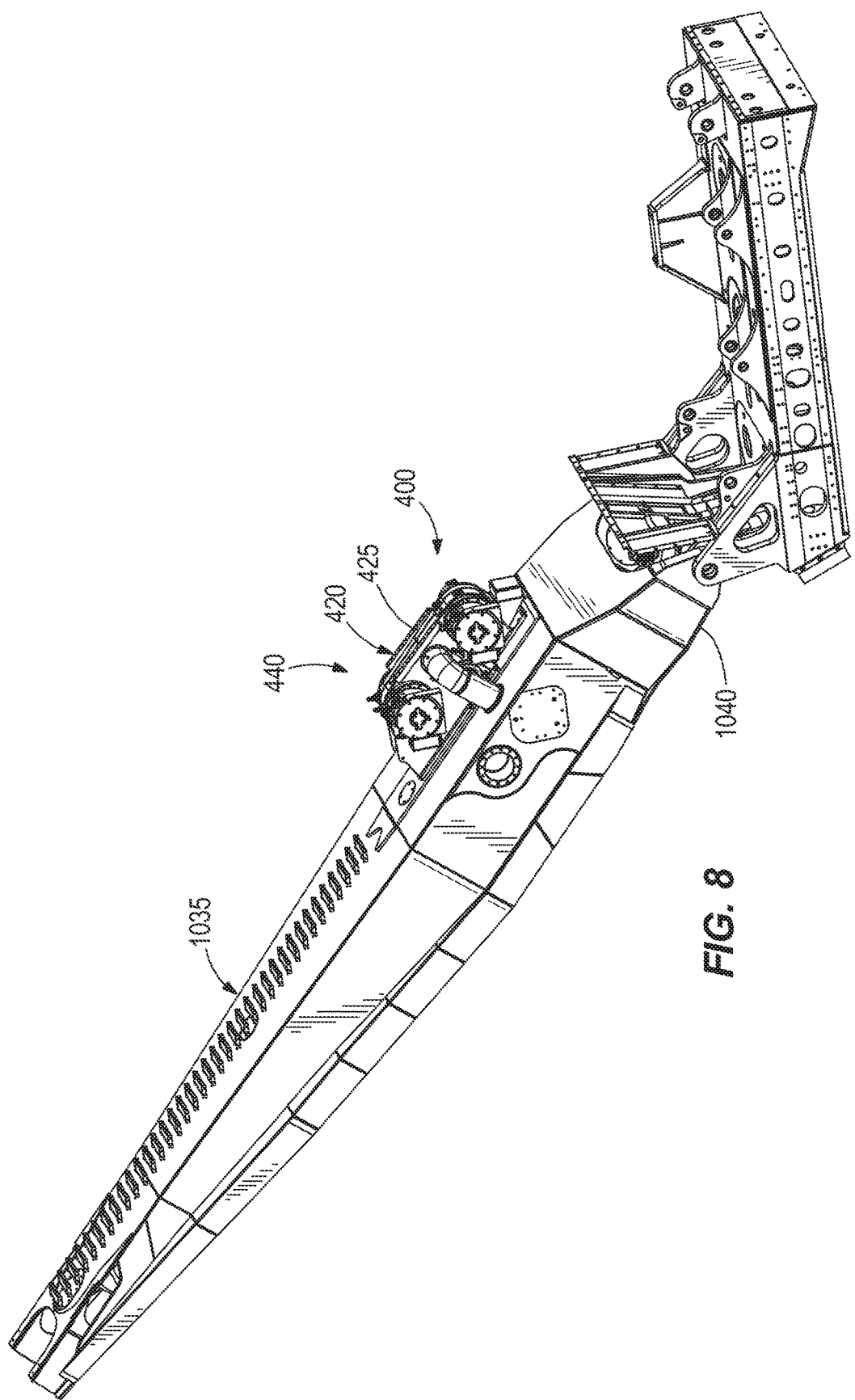
FIGS. 8-13 illustrate a transmission unit and a venting system according to another construction of the invention, the venting system including a boom of the machine as part of a duct system.

FIG. 7 illustrates a venting system 340 according to another construction of the invention. The venting system 340 employs much of the same structure and has many of the same properties as the previously-described venting systems 140 and 240 shown in FIGS. 2-6. Analogous elements to those of the venting system 140 have been given the same number plus "200."

With reference to FIG. 7, the venting system 340 including a set of ducting 390 that is positioned along an exterior surface of the boom 35. As opposed to routing the ducting 390 through the interior of the boom 35, as in venting system 240, the ducting 390 instead rests along and/or is coupled to the exterior of the boom 35. The ducting 390 directs cold air from a blower 345 to a cool air input 355 in a housing 320 of a transmission unit 300, the housing 300 including a gear case 325. Similar to the venting systems 140 and 240, the air cools the gear case 325 and the motors and the internal motor housings (not shown) disposed inside the housing 320 before exiting, for example, through external motor housings 370.

FIGS. 8-13 illustrate a venting system 440 according to another construction of the invention. The venting system 440 employs much of the same structure and has many of the same properties as the previously-described venting systems 140, 240, and 340 shown in FIGS. 2-7. Analogous elements to those of the venting system 140 have been given the same number plus "300."

As illustrated in FIGS. 8-13, the venting system 440 includes a substantially sealed boom 1035 that forms at least a portion of a ductwork for the venting system 440. Similar to the boom 35, the boom 1035 includes a lower end 1040. A transmission unit 400 is coupled to the boom 1035. The transmission unit 400 includes a housing 420 that includes a gear case 425 and internal motors and motor housings (not shown).

Figure 10:
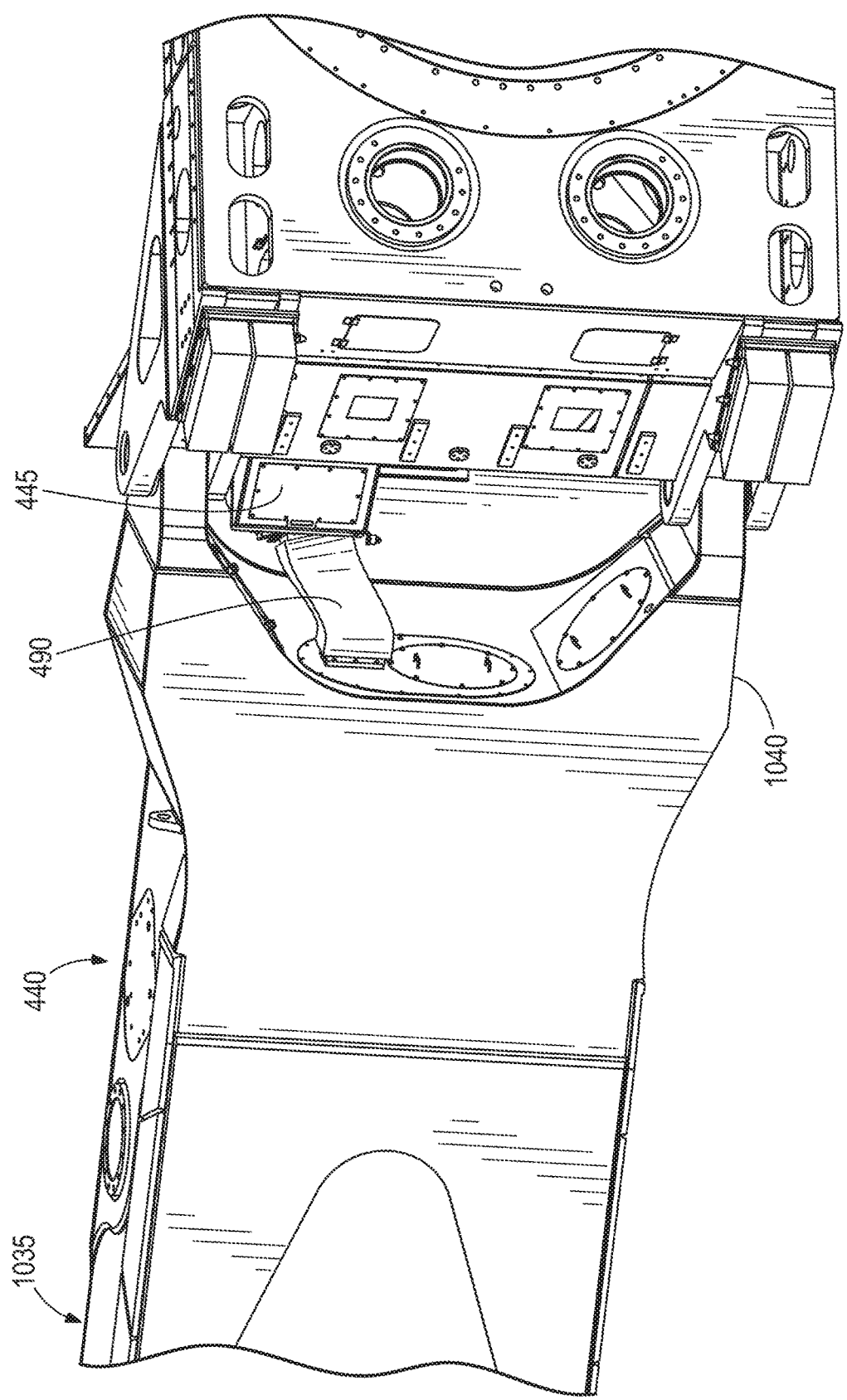
Figure 11:
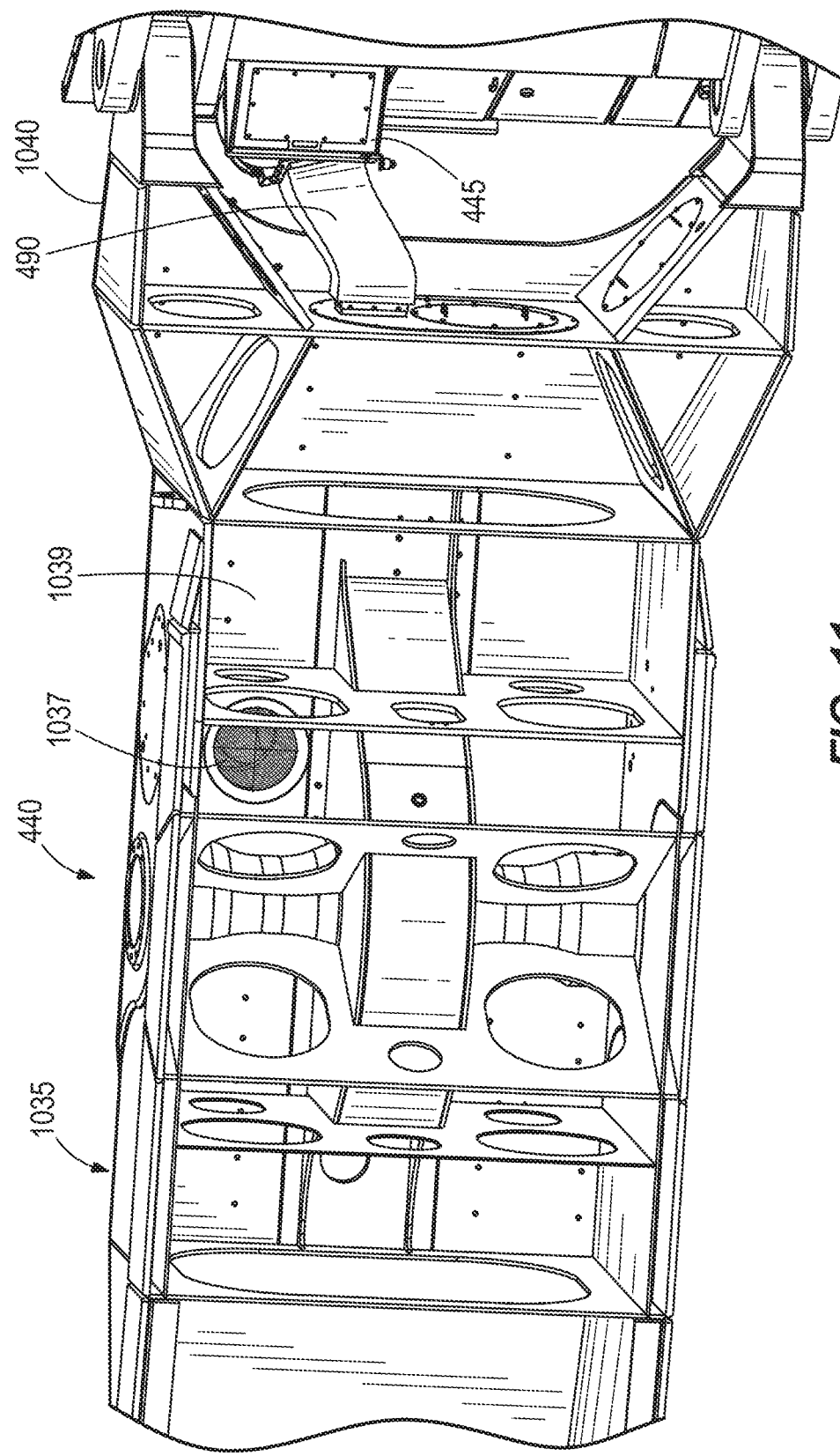
Figure 12:
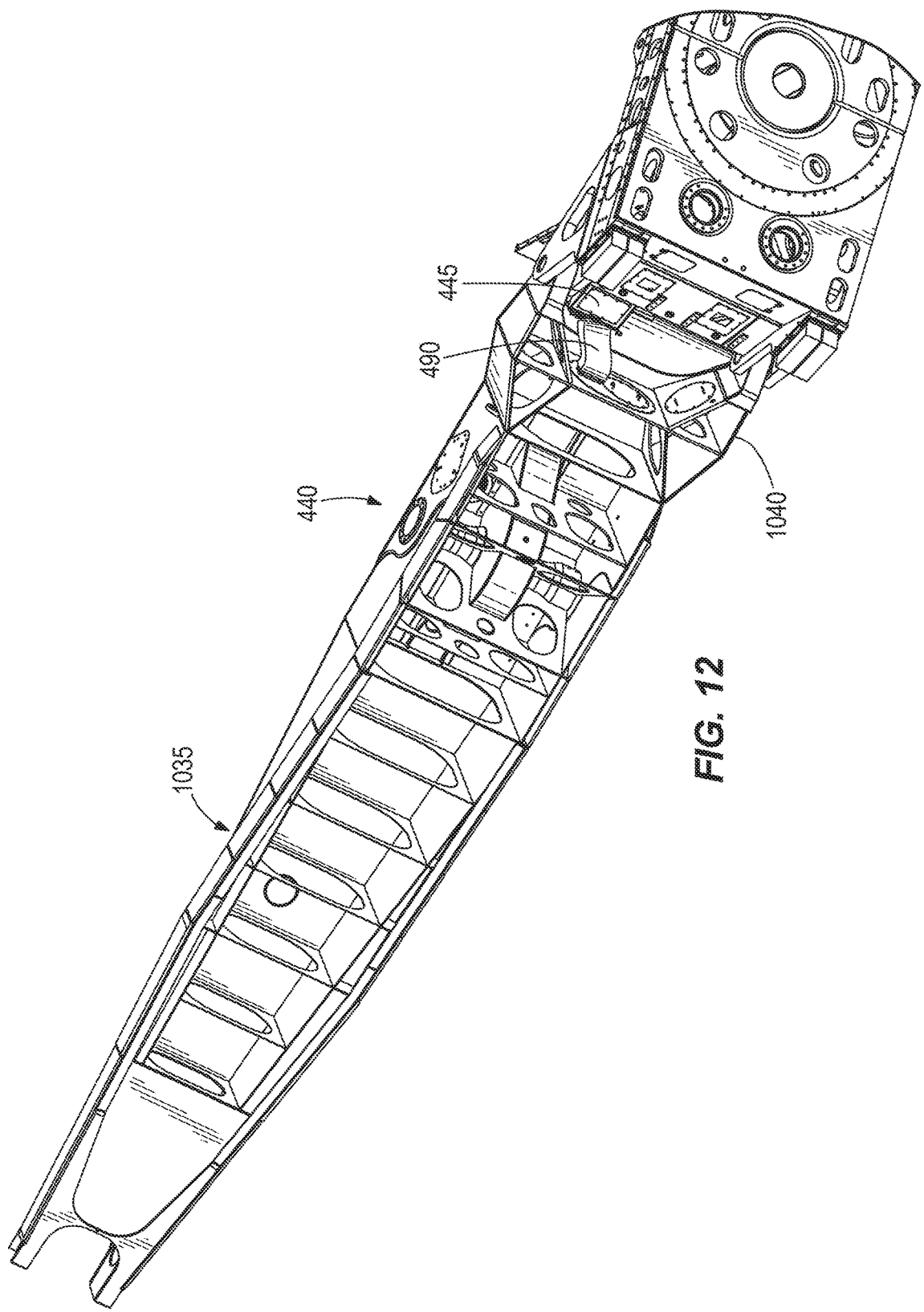

With reference to FIGS. 10-12, the venting system 440 includes a blower 445 positioned at or near the lower end 1040. The blower 445 directs cold air through a first duct section 490 directly into the boom 1035. As illustrated in FIGS. 11 and 12, the boom 1035 is substantially hollow, and is substantially sealed off from the ambient environment, as well as from the rest of any shovel to which it attaches. As the air exits the first duct section 490 and enters the boom 1035, the air is prevented or at least substantially inhibited from exiting the boom 1035, except through an aperture 1037 in the boom 1035. As illustrated in FIG. 11, the aperture 1037 is a generally circular grated opening disposed along an interior wall 1039 of the boom 1035.

Figure 9:
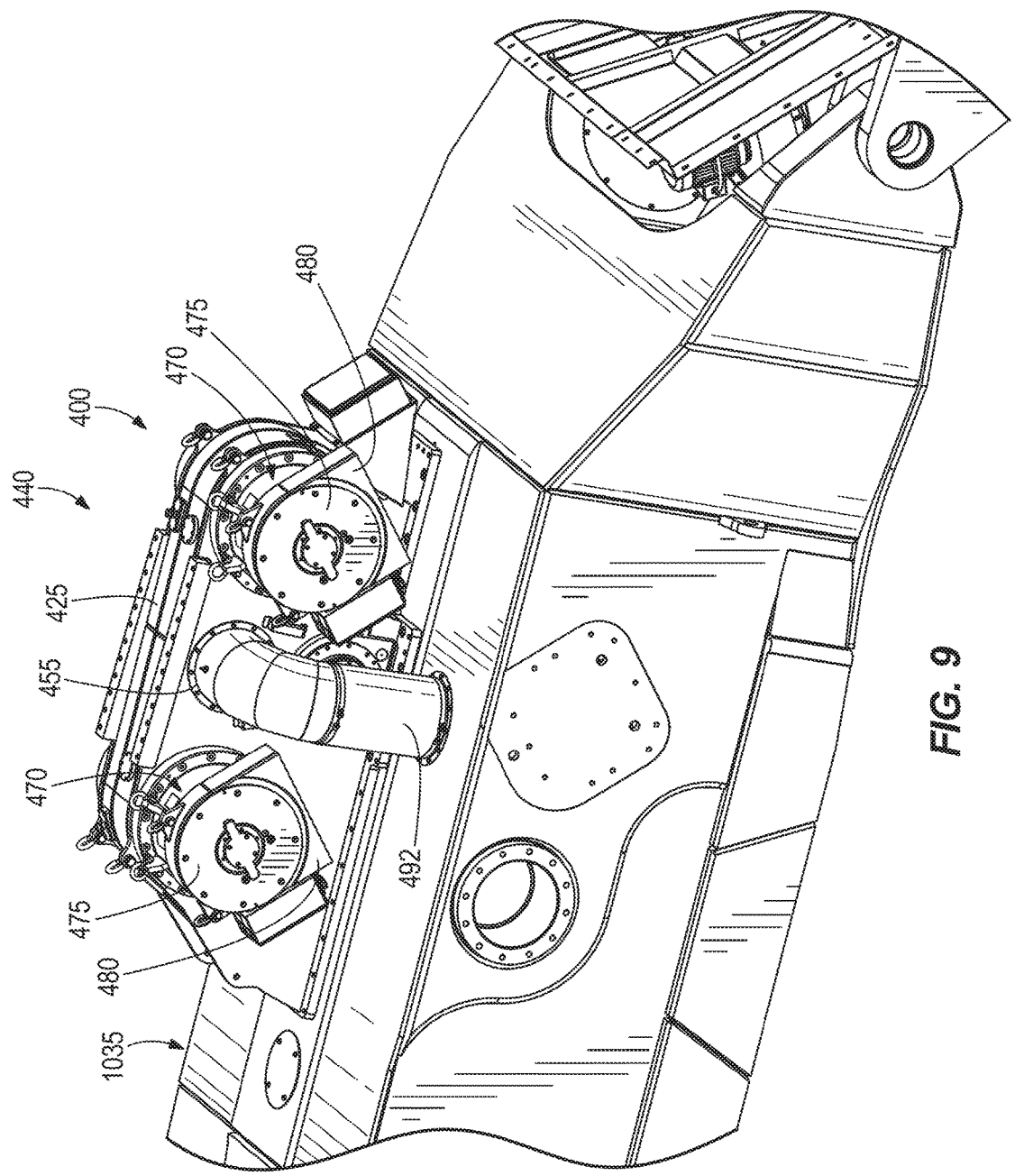

With reference to FIGS. 9 and 11, after exiting the boom 1035 through the aperture 1037, the air from the blower 445 enters a second duct section 492 that delivers the cold air to a cool air input 455 in the housing 420. Similar to the venting systems 140, 240, and 340, the air cools the gear case 425 and the motors and the internal motor housings (not shown) disposed inside the housing 420.

Figure 13:
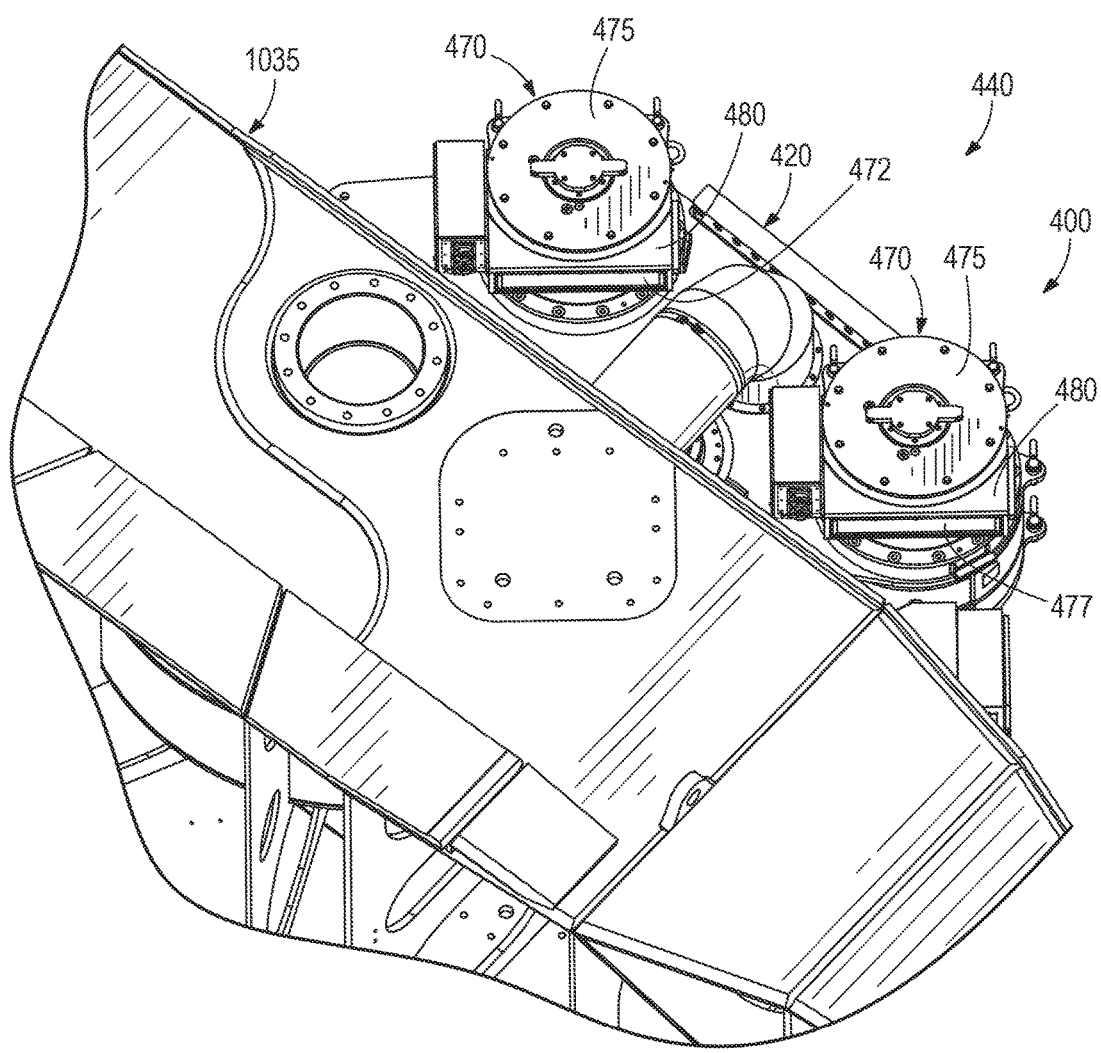

With reference to FIGS. 9 and 13, the air (which has been warmed) then exits through external motor housings 470. The external motor housings 470 include distal ends 475 spaced from the gear case 425. As illustrated in FIG. 13, the distal ends 475 include openings 477 disposed at lower portions 480 of the external housings 470 that permit the warmed air to exit the transmission unit 400 into the ambient environment. Other constructions include different exit points for the warmed air.

FIGS. 14-18 illustrate a venting system 540 according to another construction of the invention. The venting system 540 employs much of the same structure and has many of the same properties as the previously-described venting systems 140, 240, 340, and 440 shown in FIGS. 2-13. Analogous elements to those of venting system 140 have been given the same number plus "400."

Figure 14:
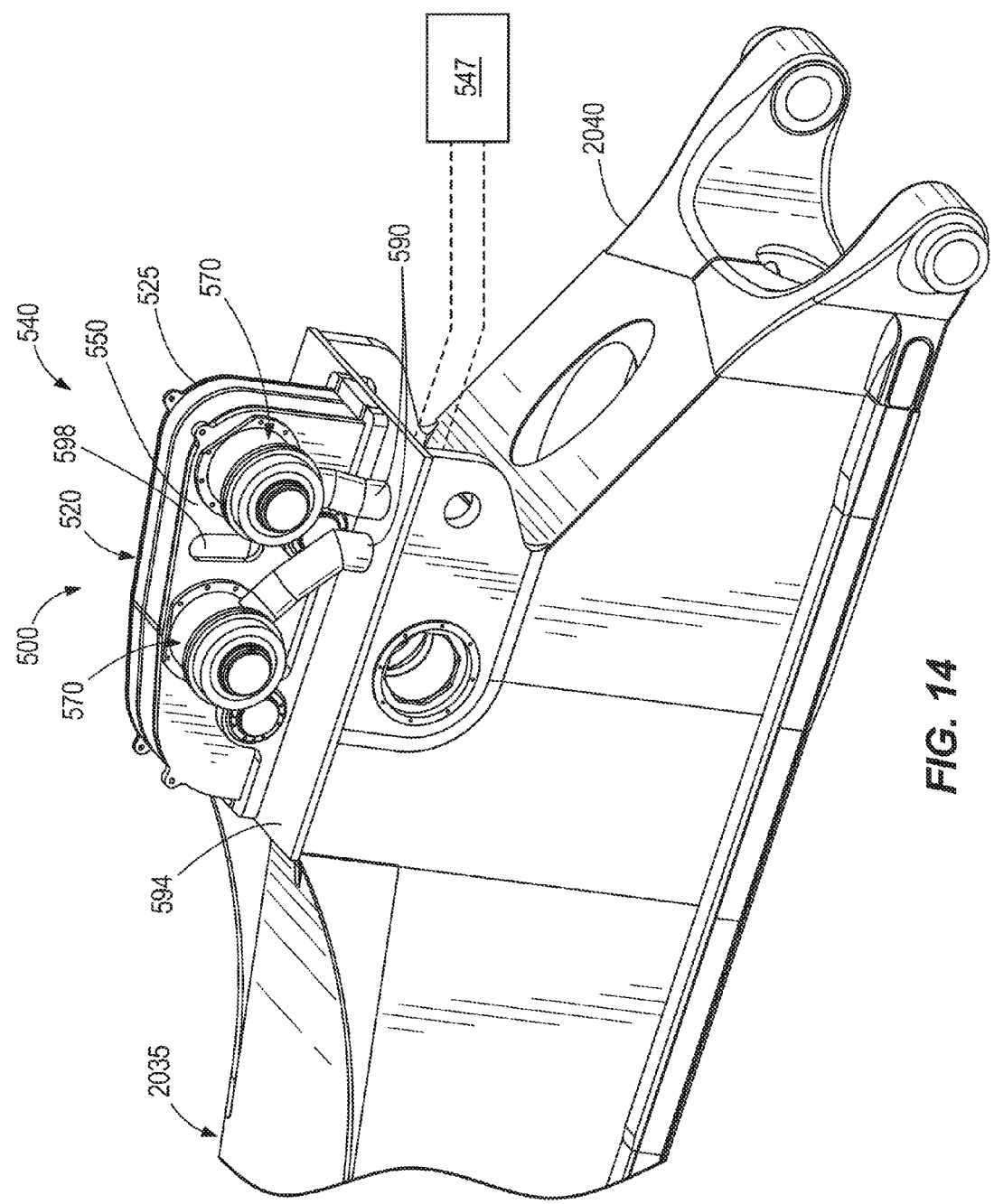
FIGS. 14-18 illustrate transmission units and a venting system according to another construction of the invention, the venting system including a centralized blower and manifold.
Figure 15:
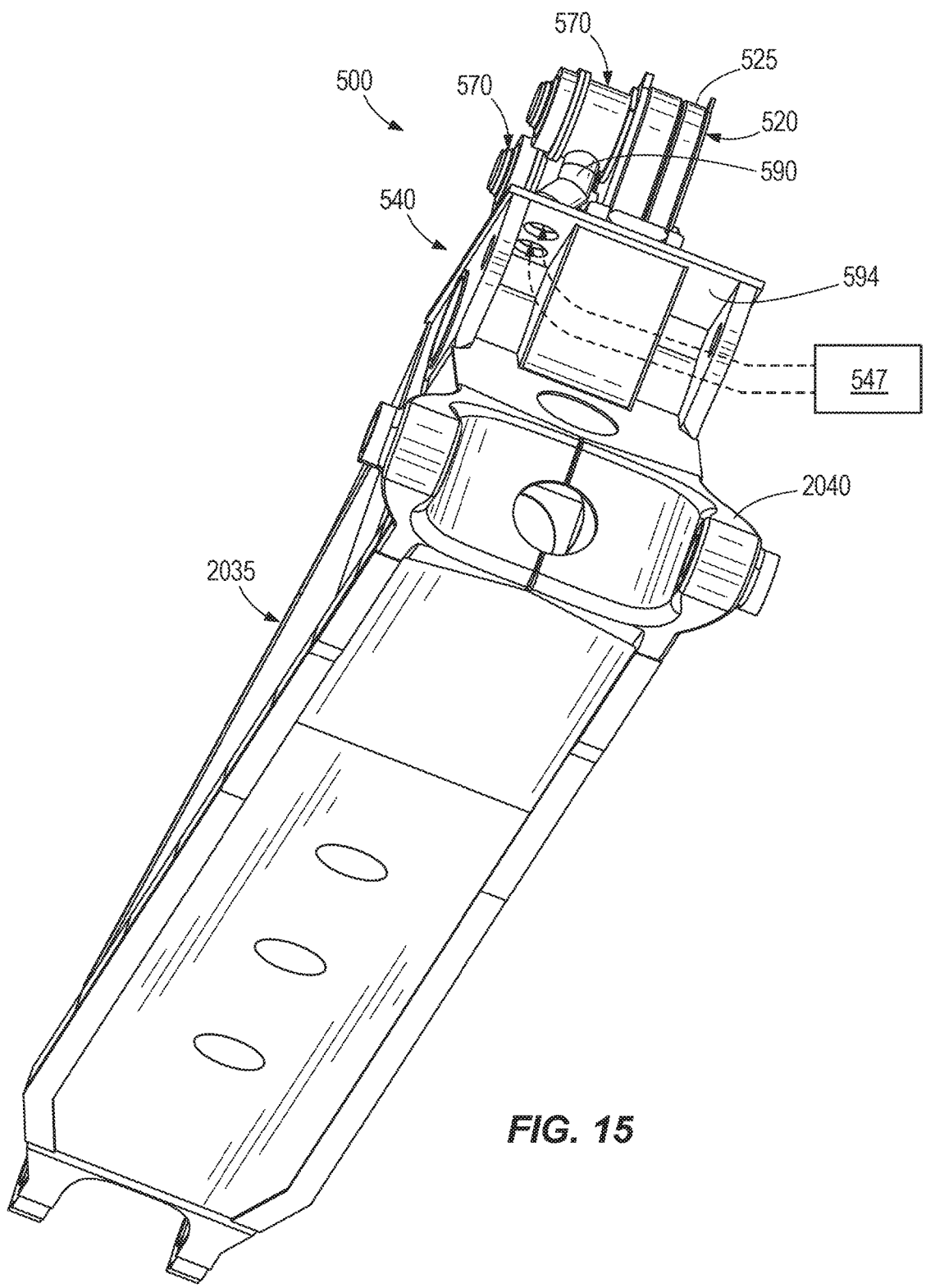

The venting system 540 is for use with a boom 2035. Similar to the booms 35 and 1035, the boom 2035 includes a lower end 2040. As illustrated in FIGS. 14 and 15, a transmission unit 500 is coupled to the boom 2035. The transmission unit 500 includes a housing 520 that includes a gear case 525 and internal motors and motor housings (not shown).

Figure 16:
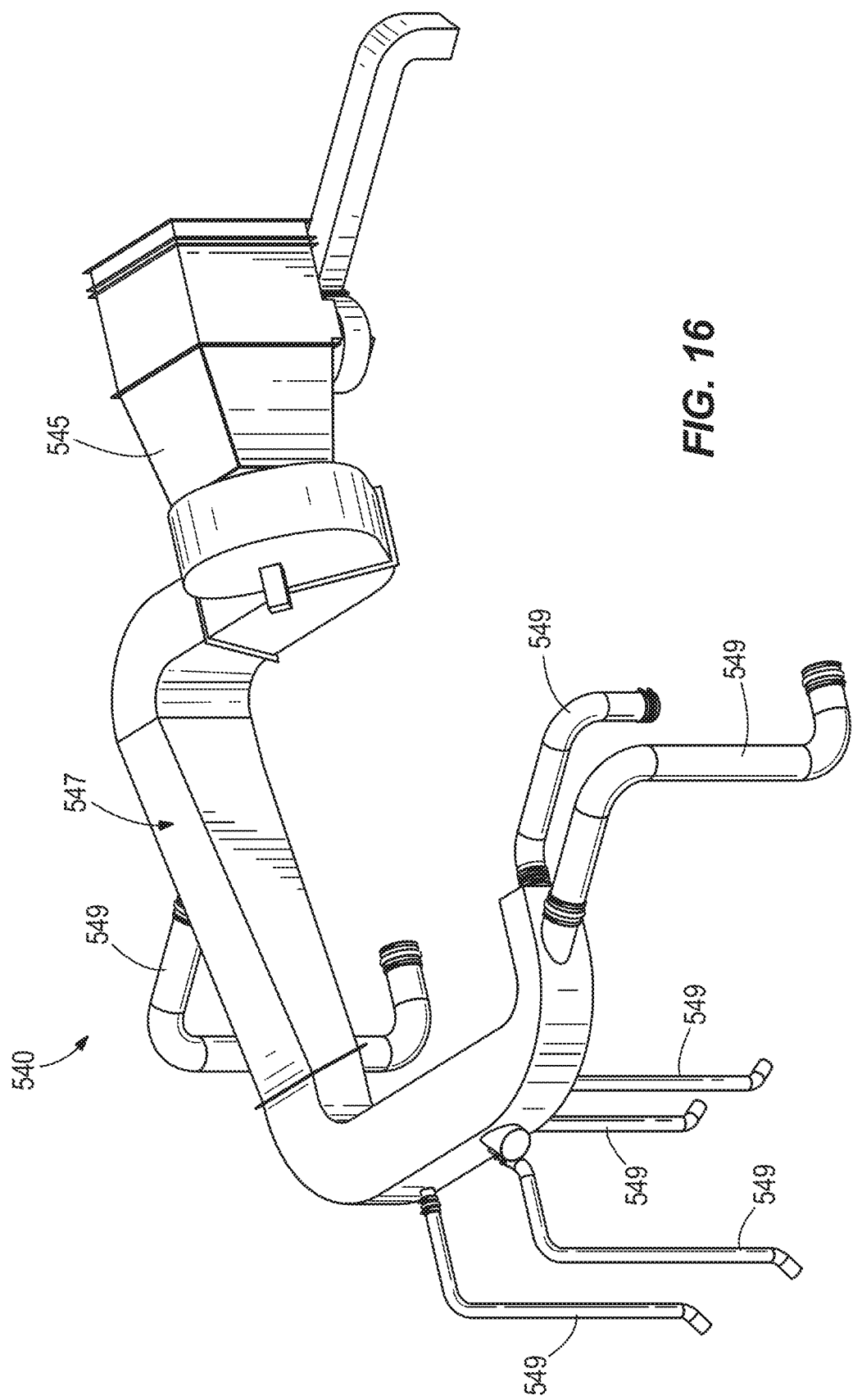

With reference to FIG. 16, the venting system 540 includes a centralized blower 545 and a manifold 547 extending from the blower 545. The manifold 547 includes a plurality of duct sections 549. The blower 545 directs cold air through the duct sections 549 to one or more components on a shovel, including the transmission unit 500. The blower 545 and the manifold 547 are sized and configured to be placed atop and coupled to a mobile base of a shovel (e.g., mobile base 15 on the shovel 10).

With reference to FIGS. 14-16, the venting system 540 includes two duct sections 590 that are disposed adjacent to the transmission unit 500. The two duct sections 590 are coupled to two exterior motor housings 570, as well as to a plate 594 on the boom 2035. As illustrated schematically in FIGS. 14 and 15, the two duct sections 590 are coupled to the manifold 547 at the plate 594 such that cold air is directed from the blower 545, through the manifold 547, through the two duct sections 590, and directly into the exterior motor housings 570.

Similar to the venting systems 140, 240, 340, and 440, the air cools the gear case 525 as well as the motors and the internal motor housings (not shown) disposed inside the housing 520. The cool air first cools the interior motor housings and motors prior to cooling the gear case 525. Once the air has cooled the motors, the internal motor housings, and the gear case 525, the warmed air then exits through an aperture 598 disposed along an exterior surface 550 of the housing 520. The aperture 598 is a vertically oriented elongate aperture disposed between the external motor housings 570, although other constructions include different numbers, locations, sizes and configurations for the aperture or apertures 598.

Figure 17:
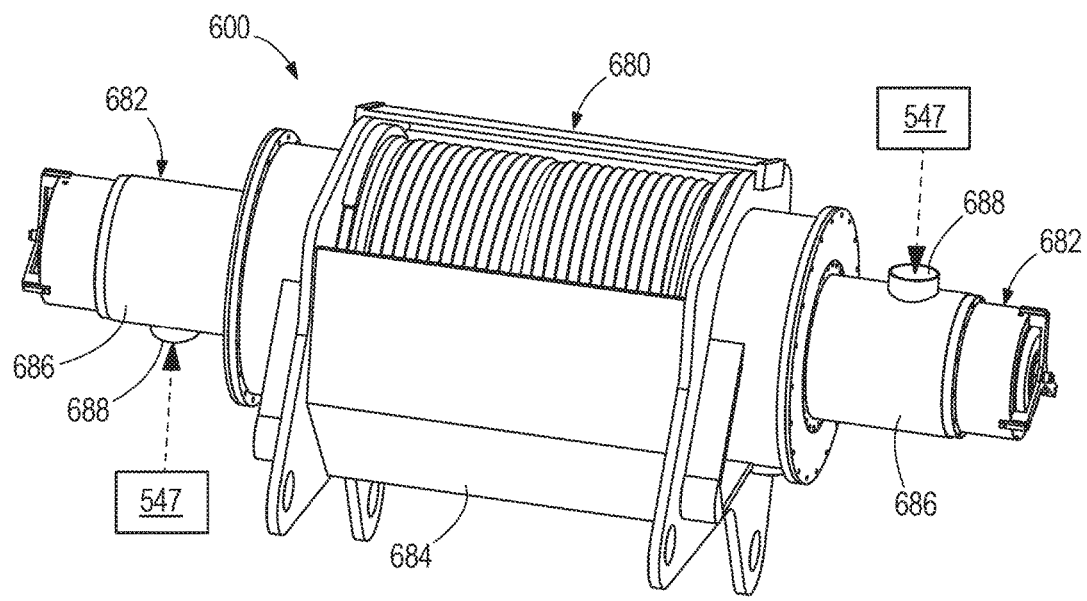
Figure 18:
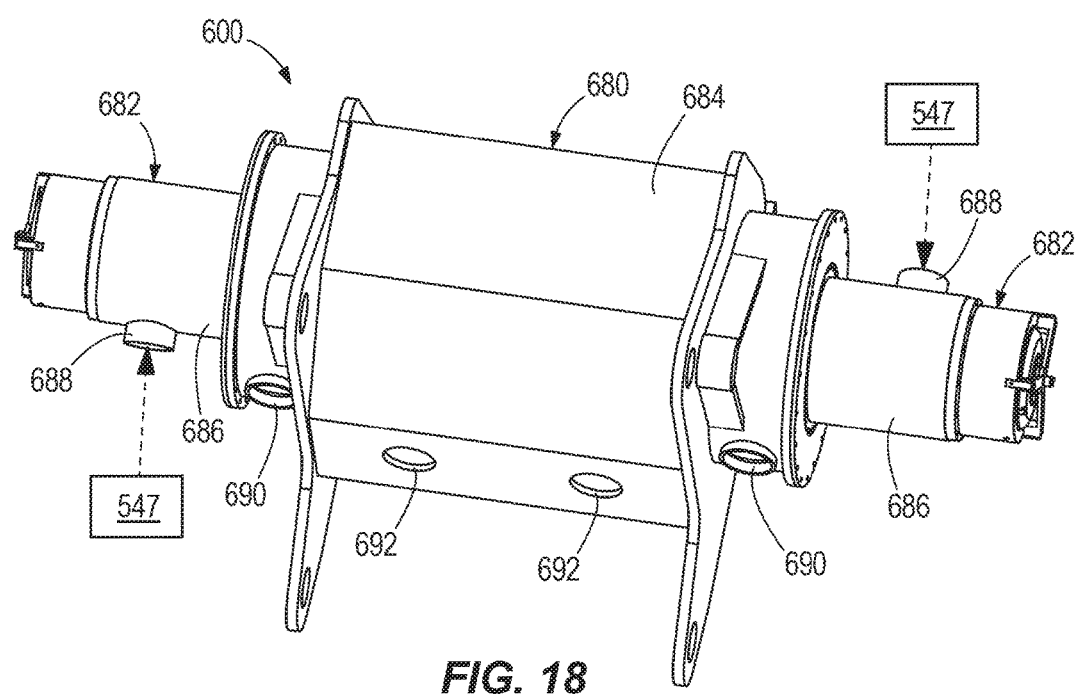

With reference to FIGS. 16-18, the venting system 540 also directs cold air to a hoist transmission unit 600 that includes a hoist drum 680 and hoist motors 682. The hoist drum 680 includes a drum housing 684, and the hoist motors 682 include motor housings 686. The hoist drum 680 and the hoist motors 682 are similar to the hoist drum 80 and the hoist motor 82 described above for shovel 10, in that the hoist drum 680 and the hoist motors 682 work together to pay out and reel in a hoist rope over the boom 2035.

As with the transmission units 100, 200, 300, 400, and 500, the hoist transmission unit 600 also experiences high levels of heat. In order to cool the components of the transmission unit 600, the same venting system 540 that directs cold air to the transmission unit 500 on the boom 2035 also directs cold air through the manifold 547 directly to two air inlet portions 688 on the motor housings 686. The cold air cools the motor housings 686, as well as the motors disposed inside the motor housings 686, prior to exiting out of two air outlet portions 690. While only one air inlet portion 688 and one air outlet portion 690 are illustrated for each motor 682, in some constructions each motor 682 includes more than one air inlet portion 688 or air outlet portion 690.

With reference to FIG. 18, the drum housing 684 further includes two vent apertures 692 disposed on a bottom surface 694 of the drum housing 684. The vent apertures 692 permit water, debris, air, or other material to flow in and out of the drum housing 684. In some constructions the venting system 540 is also connected, via the manifold 547, to one or more of the apertures 692 to direct cold air directly into the drum housing 684 and cool the drum housing 684.

Although the invention has been described in detail with reference to certain preferred embodiments, variations and modifications exist within the scope and spirit of one or more independent aspects of the invention as described.

What is claimed is:

1. A mining shovel comprising:
a boom having a sealed inner cavity;
a transmission unit coupled to the boom, the transmission unit including an outer housing; and
a venting system coupled to the boom to direct air through the sealed inner cavity, into the outer housing, and then out of the outer housing.

2. The mining shovel of claim 1, wherein the venting system includes a blower positioned at a lower end of the boom.

3. The mining shovel of claim 2, wherein the venting system includes a duct section coupled to the boom and in communication with the sealed inner cavity, wherein the blower is configured to direct cold air through the duct section into the sealed inner cavity.

4. The mining machine of claim 3, wherein the duct section is a first duct section, and wherein the venting system includes a second duct section in communication with the sealed inner cavity and the outer housing of the transmission unit, wherein the cold air from the blower passes out of the sealed inner cavity, through the second duct section, and into the outer housing.

5. The mining machine of claim 4, wherein the boom includes a circular grated opening disposed along an interior wall of the sealed inner cavity, wherein the cold air passes through the circular grated opening and into the second duct section.

6. The mining machine of claim 1, wherein the outer housing includes a gear case.

7. The mining machine of claim 6, wherein the transmission unit includes an external motor housing, wherein the external motor housing includes a distal end spaced from the gear case, and wherein the distal end includes an opening that permits air moved by the venting system to exit the transmission unit.

8. The mining machine of claim 7, wherein the opening in the distal end is rectangular.

9. The mining machine of claim 1, wherein the outer housing is coupled to an exterior of the boom.

10. The mining machine of claim 1, further comprising a dipper coupled to the boom.

11. The mining machine of claim 1, wherein the boom is substantially hollow.

12. The mining machine of claim 1, wherein the air is warmed by the transmission unit while passing through the outer housing.

* * * * *